Jan. 23, 1962 E. C. ELSNER 3,017,679
SELF-LOCKING RELEASABLE FASTENER
Filed Nov. 12, 1959 2 Sheets-Sheet 2
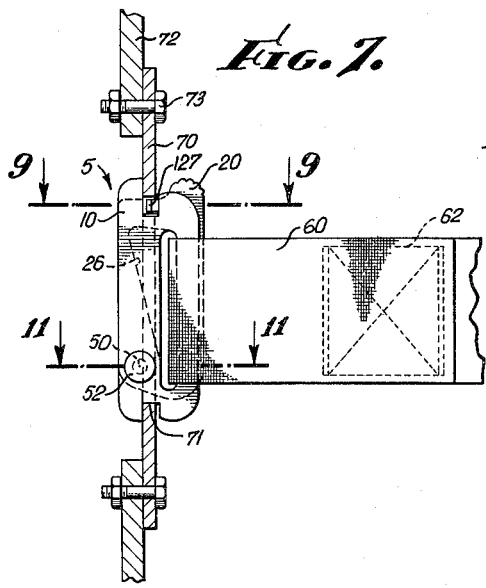
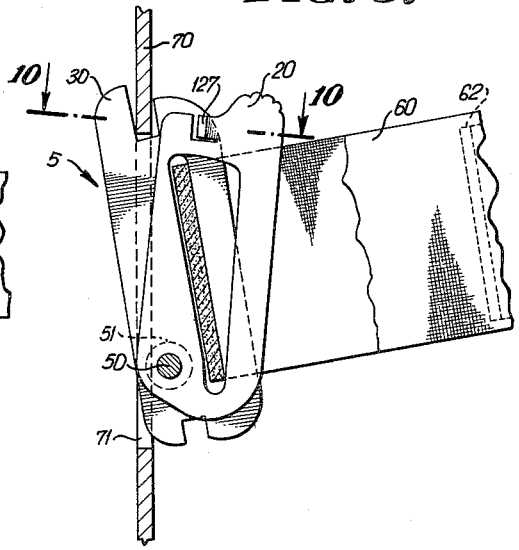
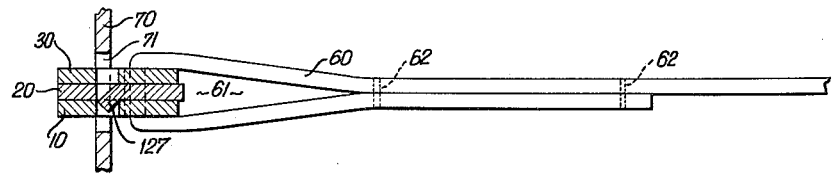
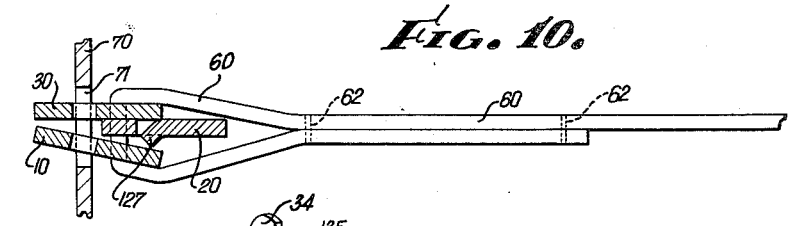
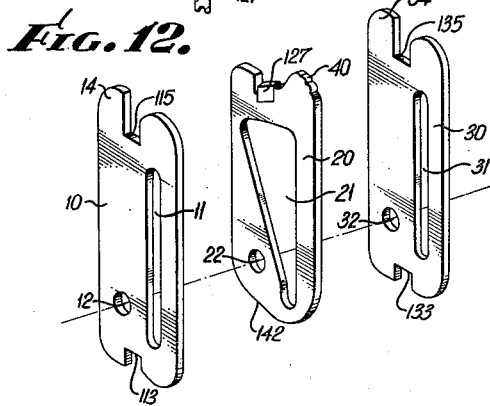
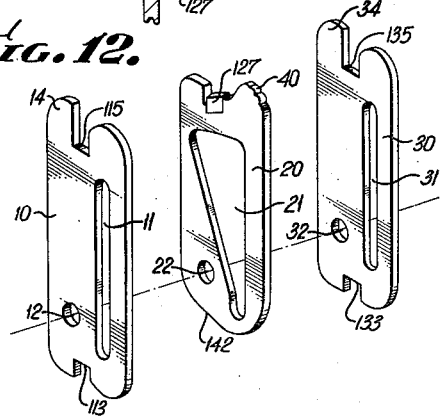
INVENTOR.
EDWIN C. ELSNER
BY Huebner & Worrel
ATTORNEYS.

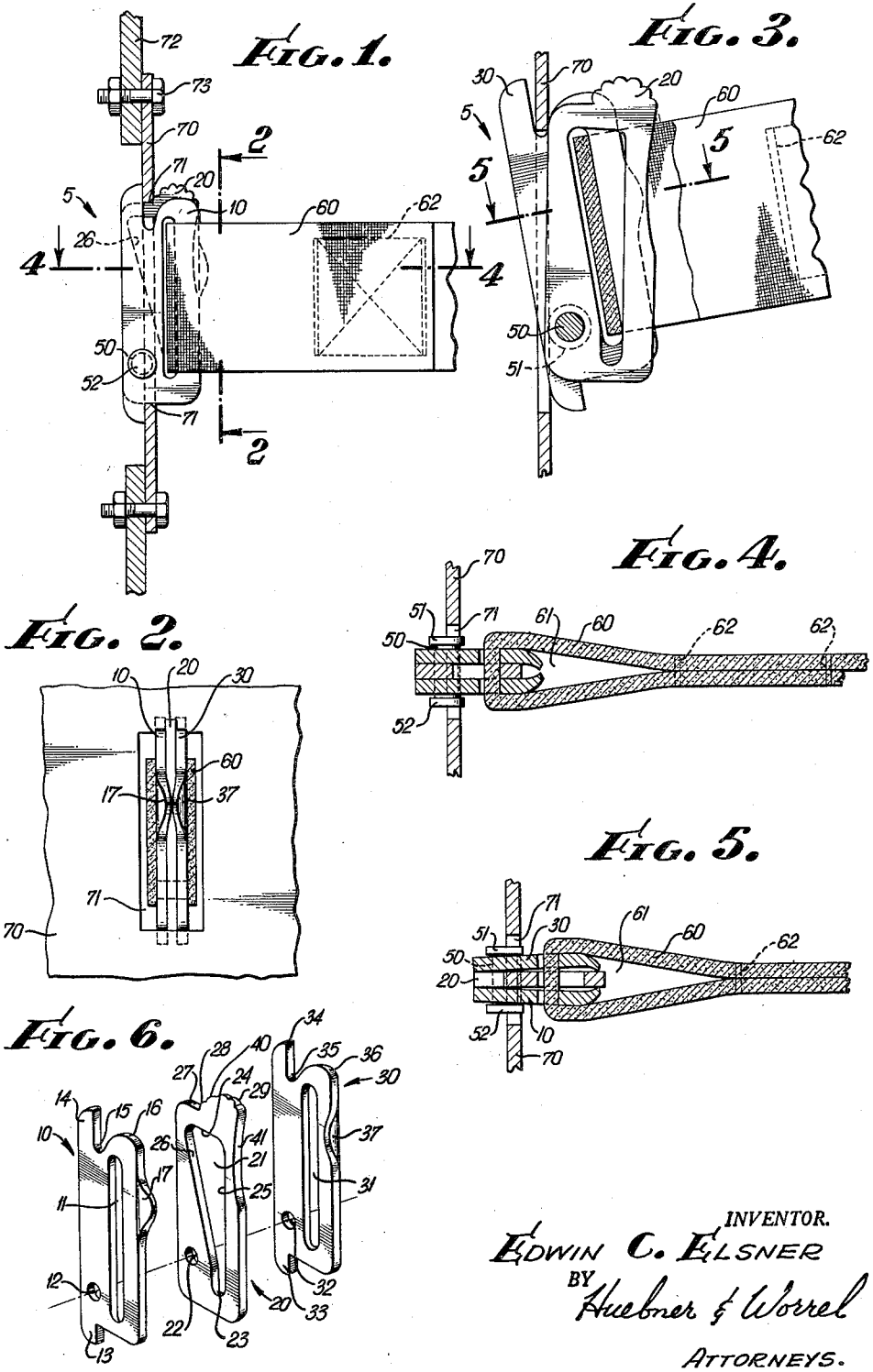

United States Patent Office 3,017,679
Patented Jan. 23, 1962

3,017,679
SELF-LOCKING RELEASABLE FASTENER
Edwin C. Elsner, Pasadena, Calif., assignor to Aeroquip Corporation, Jackson, Mich., a corporation of Michigan
Filed Nov. 12, 1959, Ser. No. 852,313
11 Claims. (Cl. 24—201)

This invention relates to a fastener used to releasably attach a length of strap or webbing to an anchor member. The fastener has self-locking means to lock the fastener to the anchor member under load tension, but it is also provided with means for quickly and easily unlocking it and removing it from attachment to the anchor member.

In cargo transportation, a length of strap or webbing is used extensively to bind and tie down the cargo. The strap or webbing is generally secured by a fastener to suitable anchor means mounted on the sides, roof or floor of the cargo transporting vehicle in such a way as to hold the cargo firmly in place.

It is most desirable to provide such a fastener that will lock firmly into position on the anchor member so as to prevent unintentional removal therefrom during transportation. At the same time, however, it is equally desirable to provide a fastener that may be readily unlatched and removed from the anchor member at arrival at unloading destination, without destruction or serious damage to the strap or webbing, so that the strap or webbing and the fastener may then be immediately available for reuse.

In such cargo handling, protruding anchor members which prevent compact packing of the cargo space, or which tend to create cargo damage, are to be avoided, and the device of the present invention consists of a fastener which is designed for use with flush anchor means consisting of a slotted opening in the sides, roof or floor of the cargo space, or a flat plate mounted substantially flush to said sides, roof or floor. It will be obvious that with such flush anchor means, ready access to limited space in the rear of said slotted opening is generally not available for manual latching or unlatching of the fastener.

An object of the present invention is to provide a cargo tie-down fastening device which is sturdy in construction, and which will securely hold a length of strap or webbing under heavy tension to an anchor member, but which is also quickly and easily releasable, without damage to said strap or webbing or said fastening device.

Another object of the invention is to provide a fastener which may be readily mounted in the slotted opening of an anchor member and securely locked therein, but which at the same time is readily removable therefrom when desired.

A further object of the invention is to provide a fastener of the character described which is rugged, but at the same time simple in design, with a minimal number of parts, and easy and inexpensive to manufacture and assemble.

Still another object of the invention is to provide a fastener which may be quickly and easily mounted, locked and released in the narrow confines of a restricted cargo space.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

FIGURE 1 is a side elevation of the fastener mounted on the anchor member, with the anchor member in section.

FIGURE 2 is a sectional view taken on the line 2—2 of FIGURE 1.

FIGURE 3 is an enlarged view, similar to a part of FIGURE 1, but with the fastener in the process of insertion into the anchor member.

FIGURE 4 is an enlarged sectional view taken on the line 4—4 of FIGURE 1.

FIGURE 5 is a sectional view taken on the line 5—5 of FIGURE 3.

FIGURE 6 is a perspective view of parts of the fastener.

FIGURE 7 is a view, similar to FIGURE 1, of an alternative form of the device of the present invention.

FIGURE 8 is an enlarged view, similar to FIGURE 3, of the alternative form of the device.

FIGURE 9 is an enlarged sectional view taken on the line 9—9 of FIGURE 7.

FIGURE 10 is a sectional view taken on the line 10—10 of FIGURE 8.

FIGURE 11 is a sectional view taken on the line 11—11 of FIGURE 7.

FIGURE 12 is a perspective view of parts of the alternative form of the fastener.

A fastener 5 is comprised of plates 10, 20 and 30, which have formed therein aligned slotted openings 11, 21 and 31, respectively. Additionally, said plates have formed therein, adjacent one end thereof, aligned bores 12, 22 and 32. Loosely mounted in said aligned bores 12, 22 and 32 is a pin 50, disposed in said aligned bores so that said plates 10, 20 and 30 may pivot on said pin 50. Pin 50 has outwardly extending flanges 51 and 52 formed on the outer ends thereof. As shown in FIGURES 4 and 5 of the drawings, pin 50 is of sufficient length to permit the lateral movement of said plates 10, 20 and 30 from the position shown in FIGURE 4 to the position shown in FIGURE 5, and vice versa.

Slots 11 and 31 are relatively long and narrow, and of a size to accommodate the strap or webbing hereinafter described. Slot 21, however, is of modified triangular configuration, and is approximately the same length as slots 11 and 31. At the end 23 of said slot 21 adjacent bore 22, said slot 21 is approximately the same width as slots 11 and 31, but at the opposite end 24 thereof it is substantially wider, so that one side 25 of said slot 21 is straight and aligned with the corresponding sides of slots 11 and 31, while the other side 26 thereof is disposed obliquely to said side 25.

Plate 10 has formed at one end thereof outwardly projecting shoulder 13. At the other end of plate 10, outwardly projecting shoulder 14, which is substantially longer than shoulder 13, forms one edge of open-ended slot 15. The other edge of said slot 15 is formed by the projection 16. Similarly, and in corresponding relationship to said shoulders 13 and 14, slot 15, and projection 16, plate 30, which is of substantially the same size as plate 10, has formed at one end thereof outwardly projecting shoulder 33 (corresponding to shoulder 13 of plate 10), and at the other end thereof, outwardly projecting shoulder 34, substantially longer than shoulder 33 (and corresponding to shoulder 14 of plate 10), open-ended slot 35, and projection 36.

Plate 20 is longer than plates 10 and 30, and is mounted on pin 50 so that one end thereof is substantially aligned with the ends of plates 10 and 30, which are adjacent pin 50, when the device is in locked position, while the other end 27 thereof is a flat surface which extends beyond the closed end of slots 15 and 35, in that position, and adjacent to said flat surface 27, and forming with said flat surface 27 a shoulder 28, is a projection 29, preferably provided with a knurled surface 40.

Formed on the edge of plate 10, opposite the edge at which shoulders 13 and 14 are formed, is an inwardly directed detent 17, and in corresponding position on plate 30 is formed inwardly directed detent 37, in opposed position to said detent 17. In corresponding position to said detents 17 and 37, plate 20 has an inwardly arched surface 41, disposed so as to permit detents 17 and 37 to overlie said plate 20 when the fastener is mounted as hereinafter described.

One end of a length of strap or webbing 60 is passed through slots 11, 21 and 31, and is then doubled back on webbing 60 to form a bight 61. Said end is then secured to said webbing 60 by any suitable means, such as by stitching 62.

An anchor member 70, having a slotted opening 71, is mounted on the sides, ceiling or roof 72 of a cargo compartment by any suitable means, such as bolts 73. The dimensions of slot 71 are such as to accommodate fastener 5, which may be loosely disposed therein and readily removed therefrom, as hereinafter described.

In operation, fastener 5, with plates 10, 20 and 30 pivotally mounted on pin 50 in overlying relationship to each other, and with webbing 60 disposed in aligned slots 11, 21 and 31, forming a bight 61, is brought into position adjacent slot 71 in anchor member 70. By pressure on knurled surface 40, plate 20 is pivoted on pin 50 until side 26 of slot 21 is aligned with the corresponding sides of slots 11 and 31, whereupon fastener 5 is obliquely inserted in slot 71 in the manner illustrated in FIGURE 3. Fastener 5 is moved laterally in slot 71 until the innermost ends of aligned open-ended slots 15 and 35 abut against the end of slot 71, at which position aligned shoulders 13 and 33 will be free to be inserted in slot 71, clear of the other end of said slot 71. When said shoulders 13 and 33 have been so inserted, fastener 5 is then moved laterally in slot 71 until the ends of plates 10 and 30 adjacent to said shoulders 13 and 33 abut against said other end of slot 71, and shoulders 13 and 33 are seated on the inside surface of anchor member 70.

Pressure in the opposite direction from the first pressure is then applied to knurled surface 40, and continued until side 25 of slot 21 is aligned with the corresponding sides of slots 11 and 31, at which point flat surface 27 of plate 20 will be in position in slot 71, shoulder 28 will be abutting against the outside surface of anchor member 70, aligned shoulders 14 and 34 will be seated on the inside surface of said anchor member 70, and fastener 5 will have assumed the position shown in FIGURE 1.

It will be readily seen that when flat surface 27 is thus disposed in slot 71, further substantial lateral movement of fastener 5 in slot 71 will be impossible, and particularly when pull tension is applied to webbing 60, compressive pressure of bight 61 will bias plates 10, 20 and 30, and detents 17 and 37, toward each other, and aligned shoulders 13 and 33, and 14 and 34, will be firmly seated on the inside surface of anchor member 70. Thus, fastener 5 will be firmly locked in position on anchor member 70, with plate 20 held by detents 17 and 37, as illustrated in FIGURE 4, against inadvertent movement to unlocking position.

When it is desired to unlock the device and remove fastener 5 from anchor member 70, rearward pressure is applied on knurled surface 40, and plate 20 is pivoted on pin 50.

Continued application of rearward pressure on knurled surface 40 will cause plate 20 to move between detents 17 and 37, separating them and unlocking the device. Said pressure is continued until side 26 of slot 21 is again aligned with the corresponding sides of slots 11 and 31. At the same time it will be seen that flat surface 27 will be moved out of position in slots 71, permitting fastener 5 to be moved laterally in slot 71 until the innermost ends of aligned, open-ended slots 15 and 35 are in abutment against the end of slot 71. Fastener 5 is then pivoted so as to move shoulders 13 and 33 through slot 71, and clear of it, again to the position shown in FIGURE 3, whereupon fastener 5 may be slid obliquely out of contact with slot 71 and anchor member 70.

In the alternative form of the device shown in FIGURES 7-12, inclusive, of the drawings, there are no inwardly directed detents 17 and 37 formed on plates 10 and 30, respectively, nor is there an inwardly arched surface 41 on plate 20. In lieu thereof, and in order to firmly lock fastener 5 on anchor member 70, and to prevent inadvertent movement to unlocking position, an obliquely protruding lance 127 is formed on surface 27 of plate 20, and parallel-sided, open-end slots 115 and 136 are formed in plates 10 and 30, respectively, in lieu of slots 15 and 35. Additionally, in lieu of projecting shoulders 13 and 33, plates 10 and 30 have formed at one end, parallel-sided, open-ended slots 113 and 133, respectively, and plate 20 may be formed with slanting end surface 142.

In the operation of said alternative form, lance 127 will be disposed in either slot 115 or slot 135, dependent on the desired oblique protrusion thereof, and anchor member 70 will be disposed in slots 113 and 133, when the device is in full locked position, and inadvertent unlocking, as by vibration, will be avoided. Rearward pressure applied on knurled surface 40 will cause lance 127 to move out of its disposition in either slot 115 or slot 135, as the case may be, and will permit full removal of the fastener from anchor member 70 in the manner hereinabove described.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

What is claimed is:

1. A fastener comprising: a first plate having an elongate slot; a relatively short outwardly extending flange at one corner of said first plate; a longer outwardly extending flange at the opposite corner of said first plate; a relatively longer second plate superimposed on said first plate, and having a triangular elongate slot substantially aligned with the slot of the first plate; a third plate superimposed on said second plate, having an elongate slot substantially aligned with the elongate slots of the first and second plates; a relatively short outwardly extending flange at one corner of said third plate, aligned with the short flange of the first plate; a longer outwardly extending flange at the opposite corner of said third plate, aligned with the longer flange of the first plate; said three plates having an aligned bore disposed adjacent to the relatively short flanges on said first and third plates; and a pin loosely disposed in said bore so as to permit the pivotal movement of said plates on said pin.

2. A fastener as defined in claim 1, wherein said second plate is mounted with one end thereof in aligned position with one end of said first and third plates when the device is in locked position.

3. A fastener as defined in claim 2, including a knurled surface on the other end of said second plate.

4. A fastener as defined in claim 3, including an inwardly directed detent on said first plate, and an inwardly directed detent oppositely positioned on said third plate, said detents overlapping said second plate.

5. A fastener as defined in claim 4, including an arched surface on said second plate in aligned position with said detents.

6. A fastener comprising: a first plate having an elongate slot, and having a second open-ended slot at one end of said plate; a relatively short outwardly extending flange at one corner of said first plate; a longer outwardly extending flange at the opposite corner of said first plate adjacent said open-ended slot; a relatively longer second plate superimposed on said first plate, and having a triangular elongate slot substantially aligned with the slot of the first plate; a third plate superimposed on said second plate, having an elongate slot substantially aligned with the elongate slots of the first and second plates, and having an open-ended slot adjacent said longer flange; a relatively short outwardly extending flange at one corner of said third plate, aligned with the short flange of the first plate; a longer outwardly extending flange at the opposite corner of said third plate, aligned with the longer flange of the first plate; said three plates having an aligned bore disposed adjacent to the relatively short flanges on said first and third plates; and a pin loosely disposed in said bore so as to permit the pivotal movement of said plates on said pin; said second plate having one end thereof mounted in aligned position with one end of said first and third plates when the device is in locked position.

7. A fastener as defined in claim 6, wherein the other end of said second plate extends substantially beyond the closed end of said open-ended slots in the first and third plates.

8. A fastener as defined in claim 7, including a lance formed on said other end of the second plate and disposed in one of said open-ended slots when the device is in locked position.

9. Means for removably attaching a length of webbing to an anchor member which comprises: an anchor member having a slot forming lips; and a fastener member removably disposed in said slotted anchor member, and comprising a first plate having an elongate slot; a relatively short outwardly extending flange at one corner of said first plate; a longer outwardly extending flange at the opposite corner of said first plate; a relatively longer second plate superimposed on said first plate, and having a triangular elongate slot substantially aligned with the slot of the first plate; a third plate superimposed on said second plate, having an elongate slot substantially aligned with the elongate slots of the first and second plates; a relatively short outwardly extending flange at one corner of said third plate, aligned with the short flange of the first plate; a longer outwardly extending flange at the opposite corner of said third plate, aligned with the longer flange of the first plate; said three plates having an aligned bore disposed adjacent to the relatively short flanges on said first and third plates; and a pin loosely disposed in said bore so as to permit the pivotal movement of said plates on said pin; and a length of webbing disposed in the aligned slots of said plates.

10. Means for removably attaching a length of webbing to an anchor member as defined in claim 9, wherein the aligned flanges of said first and third plates are seated on the lips of the anchor member slot when the fastener member is disposed in said anchor member.

11. Means for removably attaching a length of webbing to an anchor member as defined in claim 10, wherein said second plate is disposed in said anchor member so as to prevent substantial lateral movement of the fastener member in said anchor member when the device is in locked position.

References Cited in the file of this patent

UNITED STATES PATENTS

| | | |
|---|---|---|
| 320,953 | Moses | June 30, 1885 |
| 2,877,529 | Elsner | Mar. 17, 1959 |